Oct. 17, 1967 R. K. BURROUGHS 3,348,057
METHOD AND APPARATUS FOR CHECKING THE STRAIGHTNESS OF
MACHINE TOOL WAYS AND THE LIKE
Filed Sept. 17, 1964 3 Sheets-Sheet 1

INVENTOR.
ROBERT K. BURROUGHS
BY Toulmin & Toulmin
ATTORNEYS

Oct. 17, 1967  R. K. BURROUGHS  3,348,057
METHOD AND APPARATUS FOR CHECKING THE STRAIGHTNESS OF
MACHINE TOOL WAYS AND THE LIKE
Filed Sept. 17, 1964  3 Sheets-Sheet 2

INVENTOR.
ROBERT K. BURROUGHS
BY Toulmin & Toulmin
ATTORNEYS

Oct. 17, 1967 R. K. BURROUGHS 3,348,057
METHOD AND APPARATUS FOR CHECKING THE STRAIGHTNESS OF
MACHINE TOOL WAYS AND THE LIKE
Filed Sept. 17, 1964 3 Sheets-Sheet 3
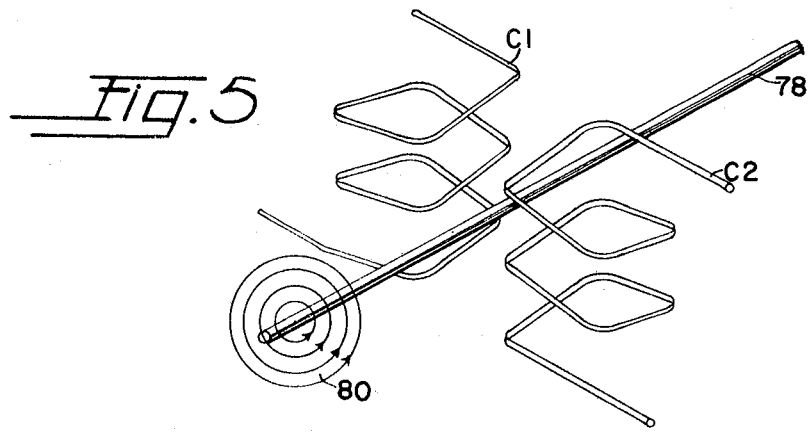
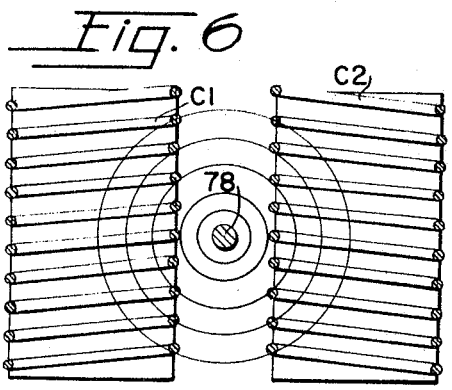
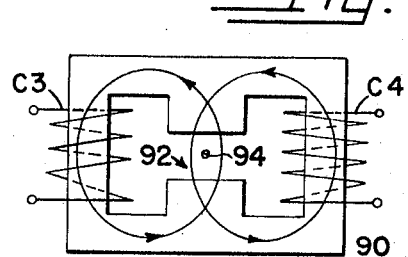
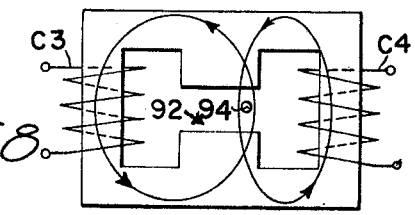
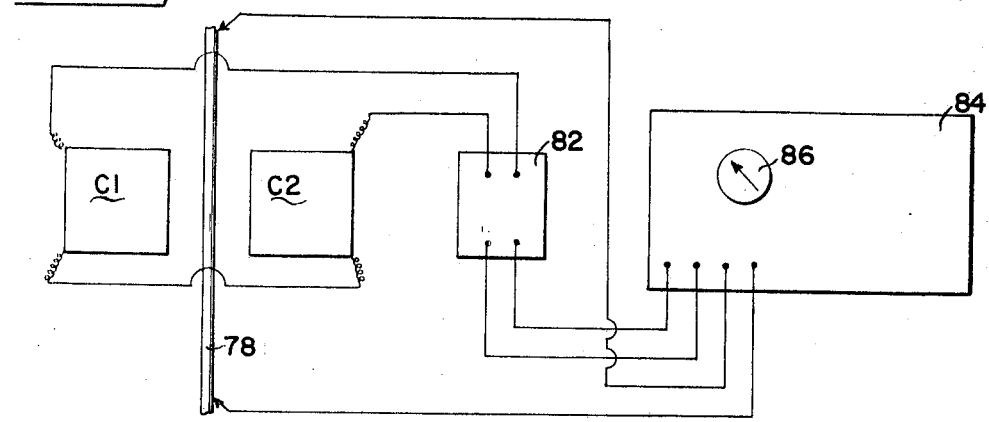
INVENTOR.
ROBERT K. BURROUGHS
BY Toulmin & Toulmin
ATTORNEYS

# United States Patent Office 3,348,057
Patented Oct. 17, 1967

3,348,057
METHOD AND APPARATUS FOR CHECKING THE STRAIGHTNESS OF MACHINE TOOL WAYS AND THE LIKE
Robert K. Burroughs, Batavia, Ohio, assignor to The R. K. Le Blond Machine Tool Co., Cincinnati, Ohio, a corporation of Delaware
Filed Sept. 17, 1964, Ser. No. 397,188
8 Claims. (Cl. 250—215)

ABSTRACT OF THE DISCLOSURE

A method of checking the straightness of machine tool ways involving the steps of stretching a filament parallel to the ways, moving a carriage along the ways, and detecting relative changes in position of a sensor mounted on the carriage and the filament.

An apparatus for checking the straightness of machine tool ways including a taut filament stretched parallel to the ways and a carriage movable along the ways. A sensor is mounted on the carriage for detecting changes in the spacing of the detector and filament as the carriage moves along the ways. In one form the sensor includes a light source and two spaced photocells. In other forms, the detector includes two electrical coils mounted on opposite sides of the filament which in these latter embodiments carries an AC current.

---

This invention relates to a method and apparatus for checking the straightness of machine tool ways and the like, and is particularly concerned with such a method and apparatus for checking the straightness in a vertical plane.

Most machine tools and other devices as well are provided with ways on which machine components are slidably supported. In a lathe, for example, the bed of the machine comprises ways on which the lathe carriage is supported. In grinding machines ways are provided on which the grinding machine table is reciprocably supported and similarly with milling machines and planers and the like, all of which include machine tool ways for slidably supporting a component for movement relative to other components of the machine.

The straightness of such ways is of extreme importance in order to produce accurate results when the machine is used. The straightness of lathe ways in a horizontal plane can be measured fairly readily with precision levels, but the straightness of such ways in a vertical plane has always been quite difficult to determine. The present invention is particularly concerned with the checking of the straightness of the ways of machine tools and the like in a vertical plane.

A primary object of the present invention accordingly is the provision of a novel method and apparatus for checking the straightness of machine tool ways in a vertical plane.

Another object of the present invention is the provision of a simplified highly effective method and apparatus which can be employed in connection with checking the straightness of machine tool ways in a vertical plane either during manufacture thereof or after the machine tool has been constructed.

A still further object of this invention is the provision of an improved method and apparatus for checking the straightness in a vertical plane in machine tool ways and the like which is extremely simple to use, but at the same time, is highly efficient and accurate.

Figure 1:
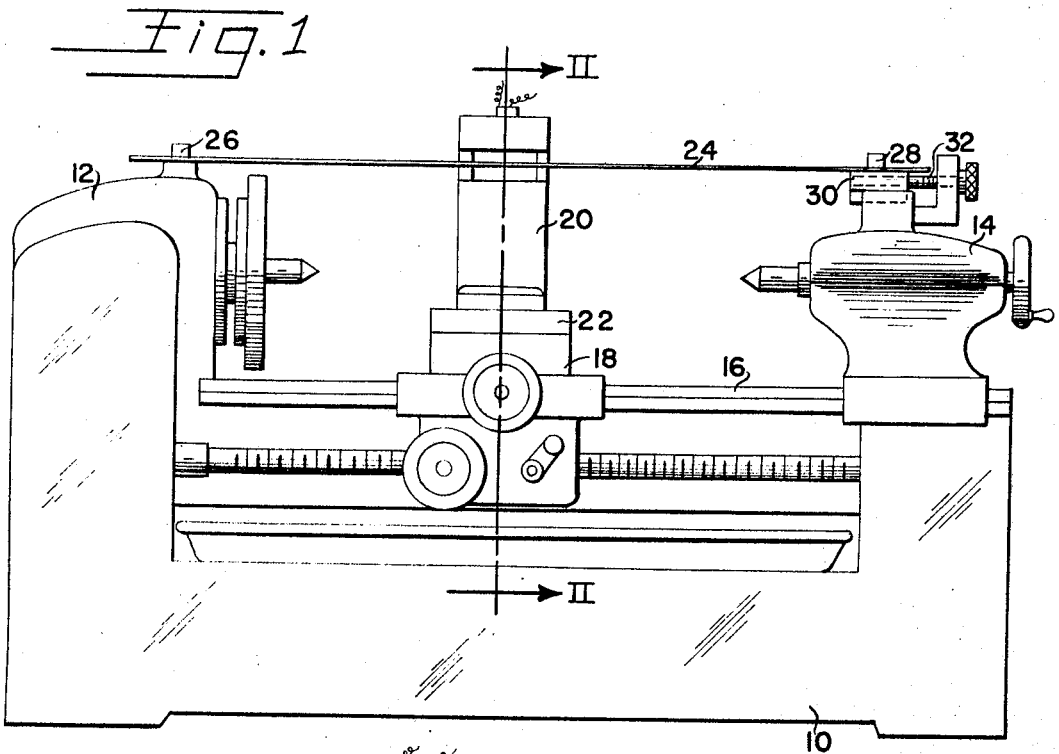
Figure 2:
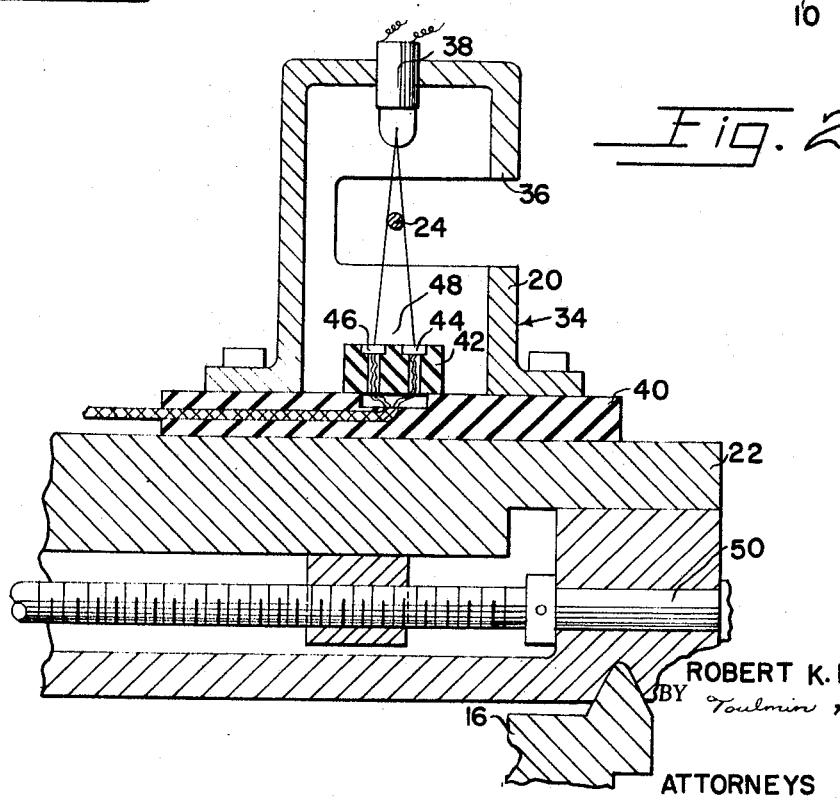
Figure 3:
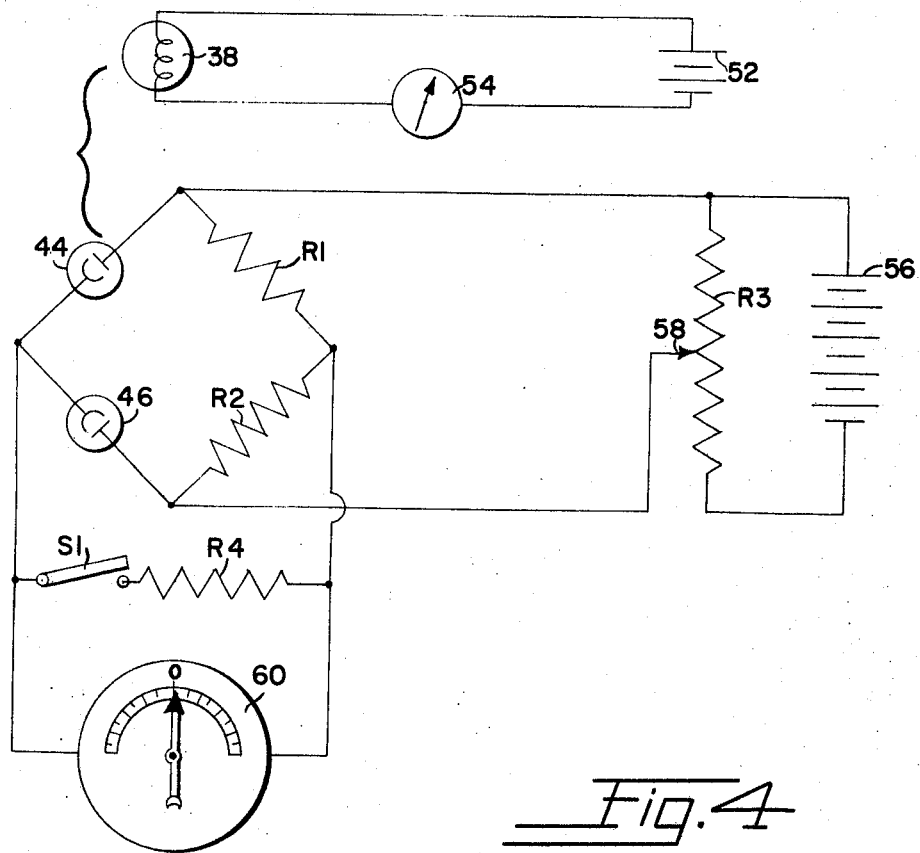
Figure 4:
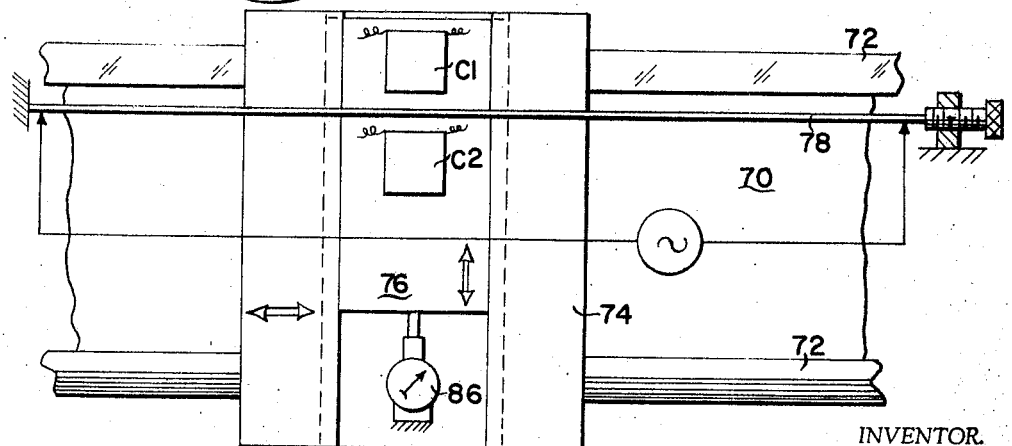

These and other objects and advantages of this invention will become more apparent upon reference to the following specification taken in connection with the accompanying drawings, in which:

FIGURE 1 is a somewhat diagrammatic view of a lathe showing a straightness checking device according to the present invention thereon;
FIGURE 2 is a vertical section on line II—II of FIGURE 1;
FIGURE 3 is a schematic diagram of the electric circuit pertaining to the device of FIGURES 1 and 2;
FIGURE 4 is a diagrammatic plan view showing a modified arrangement according to the present invention;
FIGURE 5 is a diagrammatic perspective view explaining the principle of the FIGURE 4 modification;
FIGURE 6 is a diagrammatic view showing one form that the coil arrangement of the FIGURE 4 modification can take;
FIGURES 7 and 8 are diagrammatic views showing still another modification according to the present invention, and
FIGURE 9 is a more complete circuit diagram pertaining to any of the electromagnetic modifications according to the present invention.

Referring to the drawings somewhat more in detail, in FIGURES 1 and 2 a lathe is illustrated having a bed 10 with a headstock end 12 and a tailstock end 14 and with the bed being provided with ways 16 on which a carriage 18 is slidable.

The straightness of the ways 16 in a vertical plane, which is to say deviations laterally thereof from a straight line is to be checked. The deviations vertically as mentioned before can readily be detected by a highly accurate level device.

According to the present invention, the straightness of the ways with regard to lateral deviation thereof is checked by an electro-optical system consisting of a reading device 20 mounted on the cross slide 22 of the carriage and which scans a filament 24 which is stretched straight between two stationary points. Advantageously the filament 24, which may be of any suitable material such as plastic or wire, is anchored at 26 at the headstock end of the machine and is anchored at 28 to a slide 30 mounted on tailstock 14. Slide 30 is movable by screw 32 so that filament 24 can be drawn up taut and thereby held absolutely straight. The filament 24 extends parallel to the direction of the ways 16 and this can be established, for example, by checking the filament with device 20 adjacent opposite ends of the lathe and making any necessary adjustment to bring the two readings into conformity. Thereafter, as the carriage moves along ways 16, any deviation of the ways laterally will be detected.

Turning now to FIGURE 2, it will be seen that device 20 comprises a housing 34 having a slot or opening at 36 for receiving filament 24. Housing 34 supports a source of illumination 38 such as a small electric lamp which may be provided with a lens system for throwing a beam of light of the proper configuration downwardly on filament 24. The device also comprises a base member 40 on which housing 34 is mounted and within which base member is mounted a block 42 containing a dual photocell arrangement, and individual cells being indicated at 44 and 46. The photocell arrangement is shown as comprising individual photocells in the FIGURE 2 arrangement, but it will be understood in practice the two cells are closely adjacent one another and can even be combined in a unit which is commercially available.

As will be seen in FIGURE 2, the filament 24 casts a shadow in the region indicated at 48 so that the two light cells each have a light portion and a dark portion. It will be apparent that any lateral deviation of filament 24 relative to the light source and photocells will bring about a change in the illumination of the photocells which can be measured quite accurately.

In practice, since the filament 24 is perfectly straight, the lateral deviation relatively between the light source and photocell combination on the one hand and filament 24 on the other hand will be brought about by lateral deviation of the ways of the machine tool from a straight line.

At the time of installing the device, the cross slide 22 is adjusted by its screw 50 to obtain an initial setting of the device relative to filament 24 which is thereafter maintained during the checking operation which consists of moving the carriage along the ways 16.

It will be evident that filament 24 will sag in the vertical direction somewhat between its ends but this will have no significant effect on the balance between the cells 44 and 46 because any change in illumination of the cells caused by sagging of filament 24 will be equal for both cells.

FIGURE 3 shows a circuit arrangement for detecting the change in illumination of the cells which will give an indication of the straightness of the ways being checked.

In FIGURE 3 the lamp 38 is adapted for energization by a voltage source 52 and an ammeter 54 may be provided to show that the lamp 38 is illuminated to the proper intensity.

The light cells 44 and 46 are connected in a bridge circuit that comprises, in addition to the cells, the resistors R1 and R2. A potentiometer arrangement consists of voltage source 56, resistor R3 connected across the terminals of voltage source 56, and sliding contact 58 are provided for supplying electrical energy to the aforementioned bridge to opposite corners thereof. The other opposite corners of the bridge are connected to a sensitive electrical indicating arrangement 60 which is preferably deflectable in both directions from a predetermined zero position. The instrument may be calibrated in suitable units so that lateral deviation of the rails 16 from a straight line can be read directly from the scale of instrument 60. The instrument furthermore may be provided with a by-pass resistor R4 under the control of a switch S1 to control the sensitivity of the instrument so that if the ways being measured deviate more than a predetermined amount, the switch S1 can be closed and the instrument 60 will therefore indicate larger values.

The device is simple to use and can be employed on a complete machine as illustrated in FIGURE 1 or it can be arranged for checking ways which are being machined or for checking the ways prior to complete assembly of the machine, and it can be used for checking the ways of planers or grinders on which the lathe beds are being produced. The essential thing is that the filament 24 is fixedly supported in a taut or straight condition parallel with the desired direction of the ways being checked.

The electro-optical system for checking described above is to be preferred, but it is also possible to check the ways electrically as is illustrated in FIGURES 4 through 9.

In FIGURE 4 the machine tool bed 70 has ways 72 on which a carriage 74 is slidable and which carriage has a cross slide 76. On cross slide 76 are mounted spaced coils C1 and C2, and extending in a direction parallel to ways 72 and between coils C1 and C2 is a wire 78 anchored similarly to filament 24 referred to in FIGURE 1 except that means are provided for making electrical contact with wire 76 at spaced points therealong for supplying alternating current thereto.

FIGURE 5 shows schematically the arrangement of wire 78 relative to coils C1 and C2 and the field 80 which surrounds wire 78. This is also shown in FIGURE 6, and it will readily be apparent that any lateral deviation of wire 78 relative to coils C1 and C2 will result in a change in the magnetic linkage of wire 78 to the coils that can readily be picked up by a suitable amplifying circuit.

Such a circuit is shown in FIGURE 9 wherein the two coils C1 and C2 feed a pre-amplifier 82 which, in turn, feeds a carrier amplifier 84 that includes an indicating instrument 86.

The instrument 86 could be employed for directly indicating lateral deviation of wire 78 and coils C1 and C2 or it can be employed for indicating a null position in which case the cross slide 76 is adjusted at various points of the carriage along the bed to provide for a null reading of instrument 86, and in this case, an indicator 88 mounted on carriage 74 can be employed for indicating the adjusted position of cross slide 76 and which is, of course, a direct measure of the lateral deviation of ways 72 from a straight line.

In the arrangement of FIGURES 7 and 8, substantially the same mode of operation obtains as in connection with the just described modification except that the coils C3 and C4 of FIGURES 7 and 8 are mounted on a core 90 having a central space or gap 92 in which a wire 94, corresponding to aforementioned wire 78, is disposed. As long as the conductor 94 is centered in gap 92 the flux paths through the two sides of core 90 have equal reluctance and the two coils C3 and C4 are equally effected. The lateral movement of conductor 94, as to its FIGURE 8 position, will establish different conditions through the two coils C3 and C4, which can be readily picked up by the amplifying circuit of FIGURE 9. A vertical change of conductor 94 in the horizontally extending gap 92 will, of course, be without effect.

Selective sensitivity of the checking system with respect to the particular lateral position of conductor 94 in gap 92 can be controlled by shaping of the top and bottom surfaces which confine the gap.

As mentioned before, the electro-optical system first described is to be preferred because it is somewhat simpler to obtain a straight filament in this arrangement because the filament does not have to be conductive. Thus plastic monofilaments can be employed and no problem exists with respect to kinking or twisting of the filaments as might be the case of a wire which could become kinked or bent and which, for this reason, would be extremely difficult to hold exactly straight. The electro-magnetic system, however, is highly accurate and quite practical and has been employed with success in checking the lateral deviation of machine tool ways and the like.

In respect of lateral adjustment of the scanner and filament laterally, in an assembled machine tool it is convenient to employ the cross slide screw of the machine to effect this adjustment. In other cases, this adjustment is built into the scanner.

It will be understood that this invention is susceptible to modification in order to adapt it to different usages and conditions; and accordingly, it is desired to comprehend such modifications within this invention as may fall within the scope of the appended claims.

What is claimed is:

1. In combination, a member having at least one way along which a moving member is to be guided and an apparatus for checking the straightness of said way in one plane comprising; a straight filament-like element positioned parallel to the direction of the way being checked, and means guidingly movably supported on said way and having a predetermined spacial relation to said element and including electromagnetic detecting means sensitive to a change in said spacial relation in the direction in which the straightness of the way is to be checked, said detecting means generating a signal in response to changes in said spacial relation, and means for amplifying said signal to indicate a deviation in straightness of said way.

2. An apparatus for checking the straightness in a vertical plane of machine tool ways over which a moving member is guided comprising; a straight filament positioned parallel to the direction of the ways being checked, means for tensioning said filament to insure its straightness in a vertical plane, and means carried by said moving member and having vertically aligned electromagnetic detector members positioned on opposite sides of filament adaptable for measuring the lateral deviations of said detector members from said filament as said moving member is moved over said ways, and means for indicating corresponding lateral deviations of said ways.

3. An apparatus for checking the straightness in a vertical plane of machine tool ways over which a moving member is guided comprising; a filament fixed in a direction which is parallel to the direction of the ways being checked, means for tensioning said filament to insure its straightness in a vertical plane, a housing adapted to be secured to said moving member and moved thereby over said ways, said housing also having a slot therein to receive said filament, illuminating lamp means positioned in said housing for casting a beam of light in a vertical direction on said filament, photocells positioned in side by side relation on the side of said filament opposite said lamp means and secured in said housing to receive the lights and shadows cast respectively by said lamp means and said filament, and means for detecting the change in illumination of said photocells as said housing and moving member are moved over said ways.

4. The apparatus as claimed in claim 3 in which said means for detecting the change in illumination of said photocells comprises a bridge circuit in which said photocells are connected, and galvanometer means connected in said bridge circuit for indicating the lateral deviation of said ways from said filament.

5. An apparatus for checking the straightness in a vertical plane of machine tool ways over which a moving member is guided comprising; an electrically conducting wire positioned parallel to the direction of the ways being checked, means for tensioning said wire to insure its straightness in a vertical plane, a pair of coils mounted on said moving member and positioned on opposite sides of said wire, means for passing an AC current through said wire to establish an electromagnetic field linking said pair of coils, amplifier means for amplifying the changes in magnetic linkage which result from a lateral deviation of said coils relative to said wire as the said moving member moves along said ways, and galvanometer means in circuit with said amplifier means for indicating the said changes in magnetic linkage of said coils.

6. An apparatus for checking the straightness in a vertical plane of machine tool ways over which a moving member is guided comprising; a core member mounted on said moving member and having a central space adaptable for receiving a wire therethrough, an electrically conducting wire positioned parallel to the direction of the ways being checked and also passing through the central space of said core member, means for tensioning said wire to insure its straightness in a vertical plane, a coil mounted on said core member on each side of said wire, means for passing an AC current through said wire to establish an electromagnetic field linking said coils, amplifier means for amplifying the changes in magnetic linkage which result from a lateral deviation of said coils relative to said wire as the said moving member moves along said ways, and galvanometer means in circuit with said amplifier means for indicating the said changes in magnetic linkage of said coils.

7. The method of checking the straightness of a machine tool way in one plane, the machine tool including a member moving along said way, comprising the steps of: positioning a filament-like element parallel to the direction of the way being checked, tensioning said filament to insure its straightness in a vertical plane, positioning on a moving member a source of illumination above said filament and a pair of photo-electric cells below said filament on opposed sides thereof, casting a beam of light from said source of illumination downwardly on said filament and said photo-electric cells, shifting said moving member along said way, and measuring changes in the illumination of said cells as said moving member moves along said way to determine a corresponding deviation in the straightness of said way.

8. The method of checking the straightness of a machine tool way in one plane, the machine tool including a member moving along said way, comprising the steps of: positioning an electrically conducting wire above said way parallel to the direction of the way being checked, tensioning said wire to insure its straightness in a vertical plane, positioning on a moving member a coil on each side of said wire, energizing said wire with a source of AC current, shifting said moving member along said way and measuring changes in the magnetic linkage of said wire to said coils as said moving member is moved over said way to determine a corresponding deviation in the straightness of said way.

References Cited

UNITED STATES PATENTS

| | | | |
|---|---|---|---|
| 2,116,593 | 5/1938 | Bouvier et al. | 250—203 X |
| 3,027,813 | 4/1962 | Seborg | 33—181 X |
| 3,167,605 | 1/1965 | Heidenhain | 250—231 X |
| 3,225,206 | 12/1965 | Strong et al. | 250—219 |
| 3,229,099 | 1/1966 | Schwinghamer et al. | 250—215 X |

WALTER STOLWEIN, *Primary Examiner.*